US011520548B2

(12) United States Patent
Brandl et al.

(10) Patent No.: US 11,520,548 B2
(45) Date of Patent: Dec. 6, 2022

(54) METHOD FOR SIMULATING A PRINTING PROCESS OF PRINT JOBS IN A DIGITAL HIGH-CAPACITY PRINTING SYSTEM

(71) Applicant: Canon Production Printing Holding B.V., Venlo (NL)

(72) Inventors: Gerhard Brandl, Munich (DE); Leo Graf, Neubiberg (DE); Oliver Hoffmann, Isen (DE); Oelzner Frank, Poing (DE)

(73) Assignee: Canon Production Printing Holding B.V., Venlo (NL)

( * ) Notice: Subject to any disclaimer, the term of this patent is extended or adjusted under 35 U.S.C. 154(b) by 0 days.

(21) Appl. No.: 17/067,169

(22) Filed: Oct. 9, 2020

(65) Prior Publication Data

US 2021/0109698 A1    Apr. 15, 2021

(30) Foreign Application Priority Data

Oct. 11, 2019 (DE) .......................... 102019127400.1

(51) Int. Cl.
*G06F 3/12* (2006.01)
*H04N 1/00* (2006.01)
*G06K 15/02* (2006.01)

(52) U.S. Cl.
CPC .......... *G06F 3/1282* (2013.01); *G06F 3/1234* (2013.01); *G06F 3/1296* (2013.01); *H04N 1/00042* (2013.01); *H04N 1/00244* (2013.01)

(58) Field of Classification Search
None
See application file for complete search history.

(56) References Cited

U.S. PATENT DOCUMENTS 6,657,741 B1 *  12/2003  Barry ................. G03G 15/5062
                                                      358/1.15
2004/0136020 A1 *  7/2004  Kumada ............. H04N 1/6052
                                                       358/1.9

(Continued)

FOREIGN PATENT DOCUMENTS

JP    2005222370    *  8/2005    ............... G06F 3/12
JP    2014002532    *  1/2014    ............... G06F 3/12

OTHER PUBLICATIONS

J. Zeng and Jun Li, "Operations simulation as a cloud based service," IEEE Conference Anthology, 2013, pp. 1-5, doi: 10.1109/ANTHOLOGY.2013.6784975. (Year: 2013).*

*Primary Examiner* — Beniyam Menberu
(74) *Attorney, Agent, or Firm* — The Webb Law Firm (57) ABSTRACT

In a method for simulating a printing process of print jobs in a digital high-capacity printing system with print server and printing apparatus having a plurality of modules: a simulation state of the printing apparatus is activated by (e.g. a user of) a monitoring module of the digital high-capacity printing system, a print job is started with print data at the print server by the monitoring module, the print data is transferred to the printing apparatus, printing is simulated by supplying unrastered print data to an image raster computer of the printing apparatus while data is withdrawn from the image raster computer, and feedback is provided to the monitoring module of the digital high-capacity printing system about the occurrence of an error message. The speed of the removal may correspond to the print speed.

13 Claims, 3 Drawing Sheets

(56) References Cited

U.S. PATENT DOCUMENTS

| | | | |
|---|---|---|---|
| 2004/0150853 A1* | 8/2004 | Stodersching | G06F 3/1256 358/1.13 |
| 2004/0246521 A1* | 12/2004 | Narusawa | G06F 40/106 358/1.15 |
| 2007/0188485 A1* | 8/2007 | Yasukawa | G06F 3/1234 345/419 |
| 2007/0240042 A1* | 10/2007 | Sato | G06F 3/1208 715/209 |
| 2008/0137914 A1* | 6/2008 | Minhas | H04N 1/00031 382/112 |
| 2009/0201534 A1* | 8/2009 | Truong | G06F 3/1284 358/1.15 |
| 2009/0225336 A1* | 9/2009 | Siemens | H04N 1/58 358/1.9 |
| 2009/0303536 A1* | 12/2009 | Koga | H04N 1/32496 358/1.15 |
| 2011/0279844 A1* | 11/2011 | Urasawa | G03G 15/502 358/1.13 |
| 2013/0094046 A1* | 4/2013 | Naito | G03G 15/5083 358/1.14 |
| 2014/0157115 A1* | 6/2014 | Sato | G06F 40/106 715/251 |
| 2014/0192378 A1* | 7/2014 | Misawa | G06F 3/1211 358/1.15 |
| 2017/0060494 A1* | 3/2017 | Palmen | G06F 3/1208 |
| 2017/0364314 A1* | 12/2017 | Takamoto | G06F 3/1236 |
| 2019/0056689 A1* | 2/2019 | Chou | G03G 15/0856 |

\* cited by examiner

METHOD FOR SIMULATING A PRINTING PROCESS OF PRINT JOBS IN A DIGITAL HIGH-CAPACITY PRINTING SYSTEM

CROSS REFERENCE TO RELATED APPLICATIONS

This patent application claims priority to German Patent Application No. 102019127400.1, filed Oct. 11, 2019, which is incorporated herein by reference in its entirety.

BACKGROUND

Field

The present disclosure relates to a method for simulating a printing process of print jobs in a digital high-capacity printing system.

Related Art

In digital high-capacity printing systems, it is important that sufficient rastered image data is continuously made available to the printing apparatuses in order to transfer them as dots onto the recording medium. If the speed of the transfer is itself sufficient, for example in an optical fiber cable, the computers that perform the rastering need to be continuously provided with sufficient rastered data. If a flow of rastered print data cannot be continuously supplied to the printing apparatus, the velocity of the recording medium must be reduced. However, this velocity of the recording medium significantly influences costs. Therefore, print jobs are analyzed by means of proofing tools and preflight tools before they are executed at the printing machine. The goal is to establish whether problems will possibly occur in the execution of this print job. Due to such problems, the provision of rastered data may take place at reduced speed, or even come to a standstill. Negative effects on the velocity may be avoided by means of such tools in the processing of the printing process if the print job is modified before it is executed at the printing machine. These tools are suitable in particular to find errors in the syntax of the file that contains the print job.

However, it is not always sufficient to detect all problems that occur in the execution of a print job. In particular, problems are not detected that occur only upon interaction with the respective printing apparatus upon processing at the printing apparatus itself. In the print data, specific combinations of text and graphics may be contained that generate sudden variations in the speed with which the rastering process runs at the raster unit of the printing apparatus. Such changes in the processing speed may then lead to delays in the output from the raster unit for the generation of the print image on the recording medium.

If such a delay occurs given a very large print job, the consequences are especially serious. If the printing apparatus is brought to a standstill, the entire print job must be started from the beginning. This entails large quantities of spoilage, in particular if the standstill only occurred at the end of the print job.

To prevent such standstills, the print data in the print job may be modified before the print job is restarted. The hardware of the raster computer may also be augmented, thus more processors, more RAM, and more flash storage may be used. This measure is difficult or not possible at all given a running operation.

If more hardware is used from the outset, for example 125% of the anticipated capacity is provided, this additional investment remains unused for the majority of the time. Even if the capacity of the hardware is designed for 125%, there is no certainty that a newly created print job with particular requirements for the printing apparatus will not also utilize this capacity of processors and memory.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure is to provide an improved method that enables an improved detection of problems that may produce a reduction in the speed of the provisioning of the print data.

An additional object is to efficiently and exactly predict the printing duration of the print job.

In an exemplary embodiment, a method serves to simulate a printing process of print jobs in a digital high-capacity printing system. The printing system can include a print server and at least one printing apparatus. In an exemplary embodiment, the print server and the printing apparatus have a plurality of modules that may be both software and hardware modules. In an exemplary embodiment, the method includes the following steps:

activation of a simulation state of the printing apparatus by a user of a monitoring module of the digital high-capacity printing system;

starting of a print job, comprising print data, at the print server by the monitoring module of the digital high-capacity printing system;

transfer of the print data that may have been processed by the print server to the printing apparatus;

simulated printing by supplying unrastered print data to an image raster computer of the printing apparatus while data is steadily removed from the image raster computer of the printing apparatus, wherein the speed of the removal corresponds to a print speed; and providing feedback to the monitoring module of the digital high-capacity printing system about the occurrence of an error message of the image raster computer or given an error message of one of the other modules.

In an exemplary embodiment, a print server is a computer on which print jobs are composed. A print job, also called a job, comprises the print data themselves, for example in the form of a PDF file or the file of a word processing system or a database. Moreover, additional data, for example regarding the paper on which the print data should be printed, are contained in the file with the print job. Furthermore, data regarding the job execution, in particular regarding post-processing such as folding, stitching, binding, packaging, delivery, and invoicing, are contained in the file with the print job.

In an exemplary embodiment, the simulation state is a setting of the printing apparatus, where the printing apparatus behaves as in normal operation, with two exceptions. The first exception is that the transport of the recording medium is omitted, meaning that no paper is moved. The second exception is that the generation of the dots on the recording medium is omitted. Given inkjet printers, the ink ejection via the nozzles is omitted. Given toner-based printers, the photoconductor is not exposed and no toner is transferred onto the photoconductor. In other words, the printing process is implemented in its entirety, but wherein the processes consuming material, such as paper transport and application of toner onto the photoconductor or ink ejection, are foregone.

In an exemplary embodiment, to achieve this simulation state, at a software module for monitoring the printing apparatus the adjustment is made that, for example, all elements producing actual printing activities are deactivated. For example, these are the devices for conveying ink or toner, the devices that produce the color separation on the recording medium, devices for transporting and possibly supplying the recording medium. In an exemplary embodiment, the module for monitoring the printing apparatus (also referred to as the system monitor) includes software and/or hardware. In an exemplary embodiment, the system monitor includes processor circuitry that is configured to perform one or more operations and/or functions of the system monitor.

The activation of the simulation state thus has the effect that the hardware producing the printing process itself remains inactive, whereas computers and electronics that perform the preparation of the print data remain active. At all components producing the printing process itself, maintenance tasks may thus be performed while the electronic simulation executes one or more print jobs.

The image raster computer is a unit for print rastering. In an exemplary embodiment, the image raster computer is a computer or a part of a computer that executes software for the rastering process. This rastering process may be understood as a conversion. For this process, determinations are made as to how many dots are to be generated, in which color, and at which location on the recording medium, based on the print file, using the data formats contained therein. It is hereby the computational pre-stage of the actual printing process.

Printing apparatuses use only a defined selection of colors that are printed in pure form. Four is typical; seven are also often used. In print rastering, print data are converted into raster data. Intermediate values with regard to brightness (greyscales) and color may be achieved via a suitable arrangement of raster dots, although one color is printed in a binary manner (1=printed, 0=not printed) per raster dot.

An error message is a message from a module to the computer. The message may be generated given predetermined situations. One possible situation is, for example, that the data capacity in the image raster computer is below a defined threshold. One example of an error is a font that the print job assumes is present in the printing apparatus, whereas in reality it is not present there. An additional example is syntactic errors in the print data that are not detected on the screen but lead to termination of the rastering process at the printing apparatus.

The hardware and software components that are limited by memory and processing speed are used in the simulation state, since they determine the achievable throughput of the printing apparatus. Such limitations cannot be identified with the typical tools.

In an exemplary embodiment of the method, the monitoring module ascribes predetermined weightings to different error messages.

Such weightings may serve to decide whether the print job may be processed with the predetermined parameters, or whether other parameters must be used.

In another embodiment of the method, the steps of the method are implemented repeatedly, beginning with the start of a print job, with variation of defined parameters.

One such parameter may be the speed with which the print job is executed at the printing apparatus. The operator can process the print job with a speed for which it is known that it may be administered with certainty at the printing apparatus. If this print job has been successfully executed by the printing apparatus in the simulation state, the same print job may be executed with a higher speed. Depending on the capacity of the image raster computer, one or more error messages occur after multiple iterations given a continuous increase of the speed. In this way, the highest speed is determined at which it is possible to execute the print job.

In embodiments, the method is implemented so that the monitoring module of the digital high-capacity printing system is started by a service unit (service computer), by the print server, or by a computer in the printing apparatus itself. In an exemplary embodiment, the system monitor is implemented in the service computer, the print server, or a computer or controller of the printing apparatus. In one or more aspects, the system monitor is implemented in multiple components, where the sub-modules of the system monitor cooperatively operate to perform the functions of the system monitor.

In an exemplary embodiment, a service unit is a computer that is connected with the digital high-capacity printing system via a network. For example, it may thereby be the computer of a technician. If a computer in the printing apparatus itself is used, it is thereby often the computer of the control panel at which the central controller of the printing apparatus is also installed.

In an exemplary embodiment, the method is implemented in a multiple iterations with variation of a parameter. The varied parameter is thereby preferably the print speed. A minimum printing duration may be determined from a maximum achievable print speed and from the page number contained in the print data or the length of the material web.

In an exemplary embodiment, the method may also be implemented at multiple different printing apparatuses. The maximum achievable print speed may then be determined for each printing apparatus with the iterative method described in the preceding. That printing apparatus at which a production is possible at the lowest cost or most quickly may thereby then be determined under consideration of the costs of the respective printing apparatus.

Figure 1:
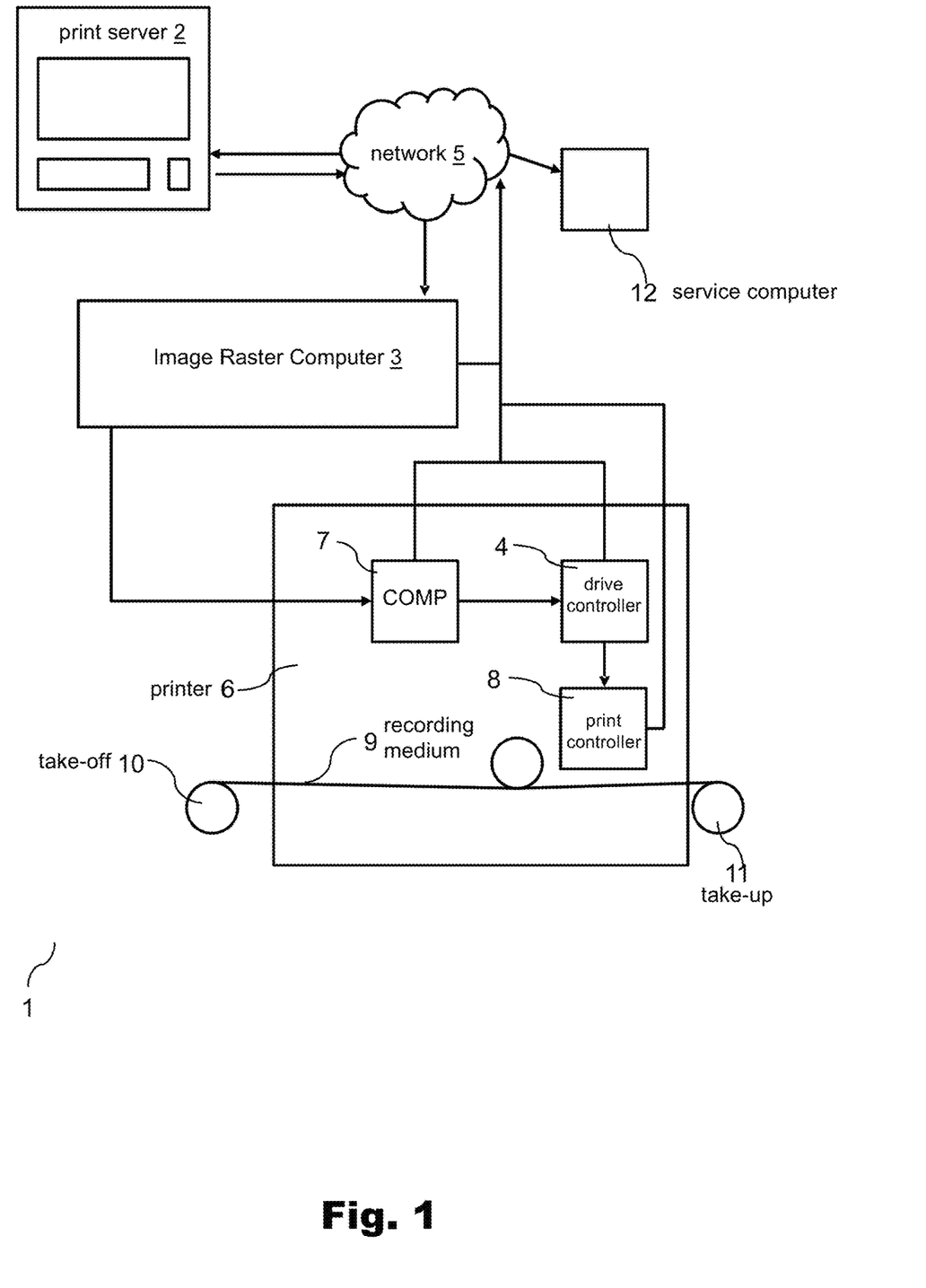
FIG. 1 a high-capacity printing system according to an exemplary embodiment.

A high-capacity printing system 1 according to an exemplary embodiment is depicted in FIG. 1. A print job is created at a print server 2. The print server 2 is connected with the printing apparatus 6 via a network 5. The network 5 may be a network within a printing operation, for example a LAN/WLAN. However, it may also be a network of a commercial vendor, referred to as a cloud. A job for the printing apparatus 6 is created at the print server 2. Such a print job contains print data. These print data may be a PDF file, a document from a word processor, or a graphic file, for example. Moreover, data that relate to the execution of the job are also contained in the print job. Among these are, for example, the designation of the paper or of another recording medium that should be printed to; a pretreatment of the paper that should be performed by the printing apparatus; and specifications regarding post-processing. Among post-processing are processes such as folding, stitching, binding, but also the packaging and shipping of the print job, as well as information regarding invoicing. In an exemplary embodiment, the printing system 1 (and/or one or more components therein) includes processor circuitry that is configured to perform one or more operations and/or functions of the printing system 1 (and/or respective component(s)).

The printing apparatus 6 has a computer 3 that rasters the image data. The computer 3 may be referred to as image raster computer 3. As of a certain size of the high-capacity printing apparatus, it is necessary to construct the image raster computer 3 from a plurality of mainboards. Depending on the quantity of data to be processed, cabinets with up to 32 or even 64 mainboards are used for this. Therefore, here the image raster computer 3 is depicted separately from the actual printing apparatus 6. However, given smaller data quantities to be processed, it is also possible that the image raster computer 3 is realized in a computer integrated into the printing apparatus 6. For example, this may be the computer (central controller) 7 for the control panel. Furthermore, in FIG. 1 additional hardware components are present inside the printing apparatus 6: the controller of the drives (drive/transport controller) 4 for the recording medium 9 and the controller (print controller) 8 for the application of ink onto the recording medium 9. For service purposes, a service computer 12 may additionally be connected to the printing apparatus 6 via the network or directly. The take-off 10 and the take-up 11 for the recording medium 9 in the form of a belt are indicated here. However, it is possible without further measures to also realize the disclosure with a printing apparatus for recording media in the form of a sheet.

Figure 2:
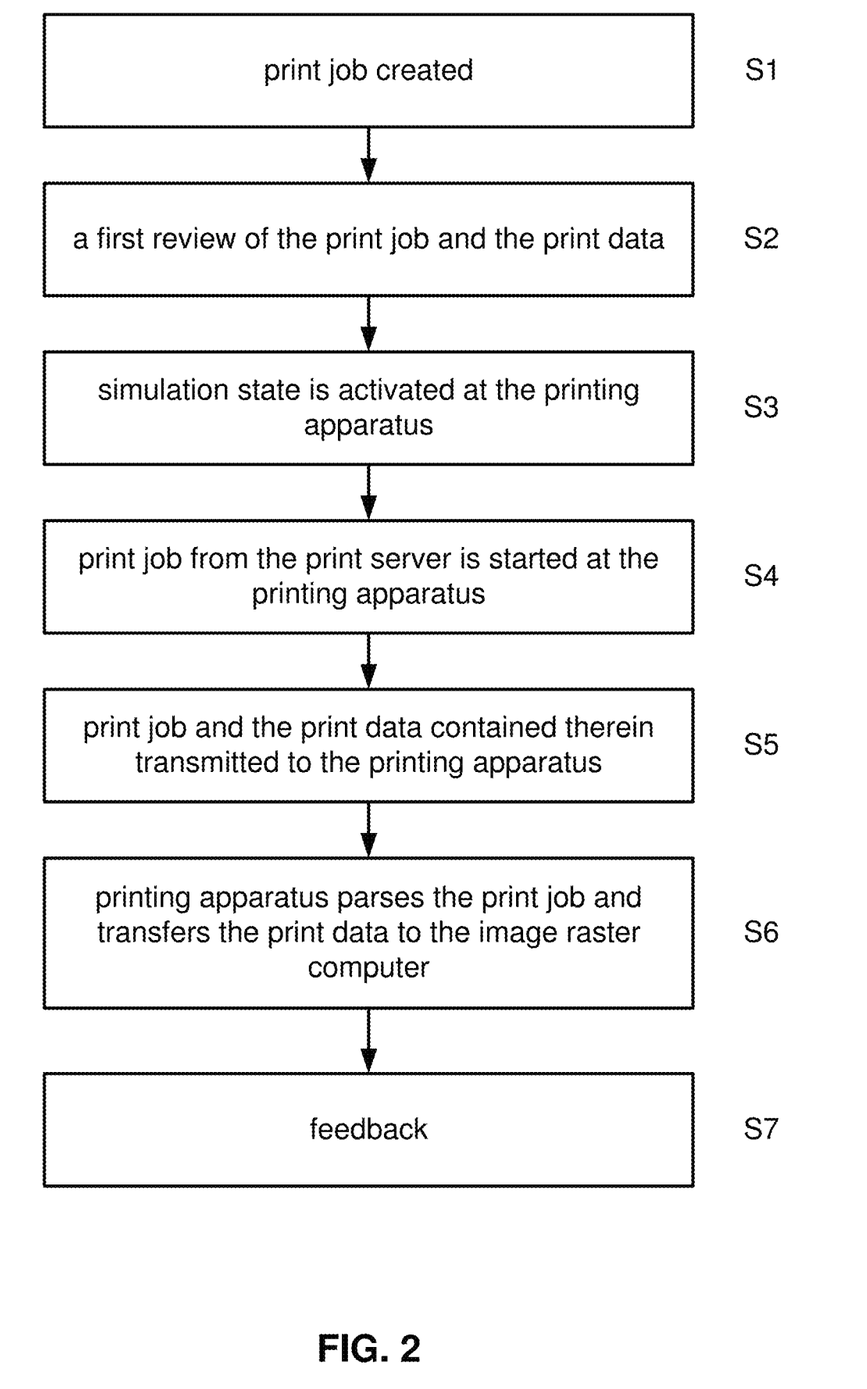
FIG. 2 a flowchart of a method according to an exemplary embodiment.

The method of the disclosure is depicted in FIG. 2. Initially, in step S1 a print job is created at the print server 2. In step S2, which for the most part is still performed at the print server 2, a first review of the print job and the print data takes place by means of one of the aforementioned tools for emulation. As illustrated above, however, these tools cannot detect all problems that occur in the printing process at the printing apparatus. Some problems are namely dependent on the printing apparatus itself and occur only at a specific printing apparatus, whereas the same print job may be realized without problems at a different printing apparatus. If no problems occur in step S2, or if the problems occurring in step S2 have been remedied, the method continues in step S3.

In step S3, the simulation state is activated at the printing apparatus 6. Simulation state means that all electronic activities that relate to the print data are executed while all activities of the printing apparatus that would lead to material consumption are omitted. Such activities are paper transport or the transport of a different recording medium, the exposure of the photoconductor and the subsequent apparatus of toner onto the photoconductor in toner-based printers, or the provision of ink and the ejection of ink via the nozzles in inkjet printers. Furthermore, all activities of the printing apparatus in which parts are moved are omitted. Maintenance tasks may thereby continue to be implemented while the printing apparatus is in simulation operation.

In step S4, a print job from the print server is started at the printing apparatus 6. In step S5, print job and the print data contained therein are then transmitted to the printing apparatus 6.

In step S6, the printing apparatus 6 begins to parse the print job and transfer the print data to the image raster computer 3 for the image rastering. The memory in the unit 7 for the processing of rastered image data thus begins to fill. If this memory is completely filled, it is emptied again in that the data are forwarded to the unit for generating dots or are deleted. The speed of the forwarding or deletion thereby corresponds to the speed with which the print data have been drawn from the memory in normal operation. In the normal instance, this corresponds to the transport velocity of the recording medium, which is contained in the data of the print job. In the normal instance, at this point in time as of yet unrastered print data are present that still are to be processed by the image raster computer 3. This data continues to be written into the emptying memory. This emptying takes place due to the forwarding or deletion described above.

If it now occurs that the image raster computer 3 is to process a large quantity of print data, for example because an image file must be rastered, its processing speed decreases in relation to the processing speed in an instance in which only text is to be processed. The decreasing processing speed in turn leads to the situation that more data are drawn from the unit 7 for preparing rastered image data than the image raster computer 3 can supply. In the extreme case, it may occur that the output memory of the image raster computer 3 is completely emptied. In normal printing operation, this would lead to the stopping of the transport for the recording medium, and thus cause a great deal of spoilage and high costs. In the simulation operation, this leads to the situation that the feedback to the monitoring module in step S7 contains an error message.

By contrast, if the print job can be executed without any problems, the feedback in step S7 contains only a report about the successful execution. Additional problems that may cause an error message are, for example, fonts that are not contained in the print job because it was assumed in the creation of the print job that these fonts are already stored in the printing apparatus 6. One possible cause of this is that different customers use different file names for the same font. The corresponding font is then not detected by the printing apparatus 6 although a file with the correct font is present in the printing apparatus. An error message is also generated here in step S7.

Figure 3:
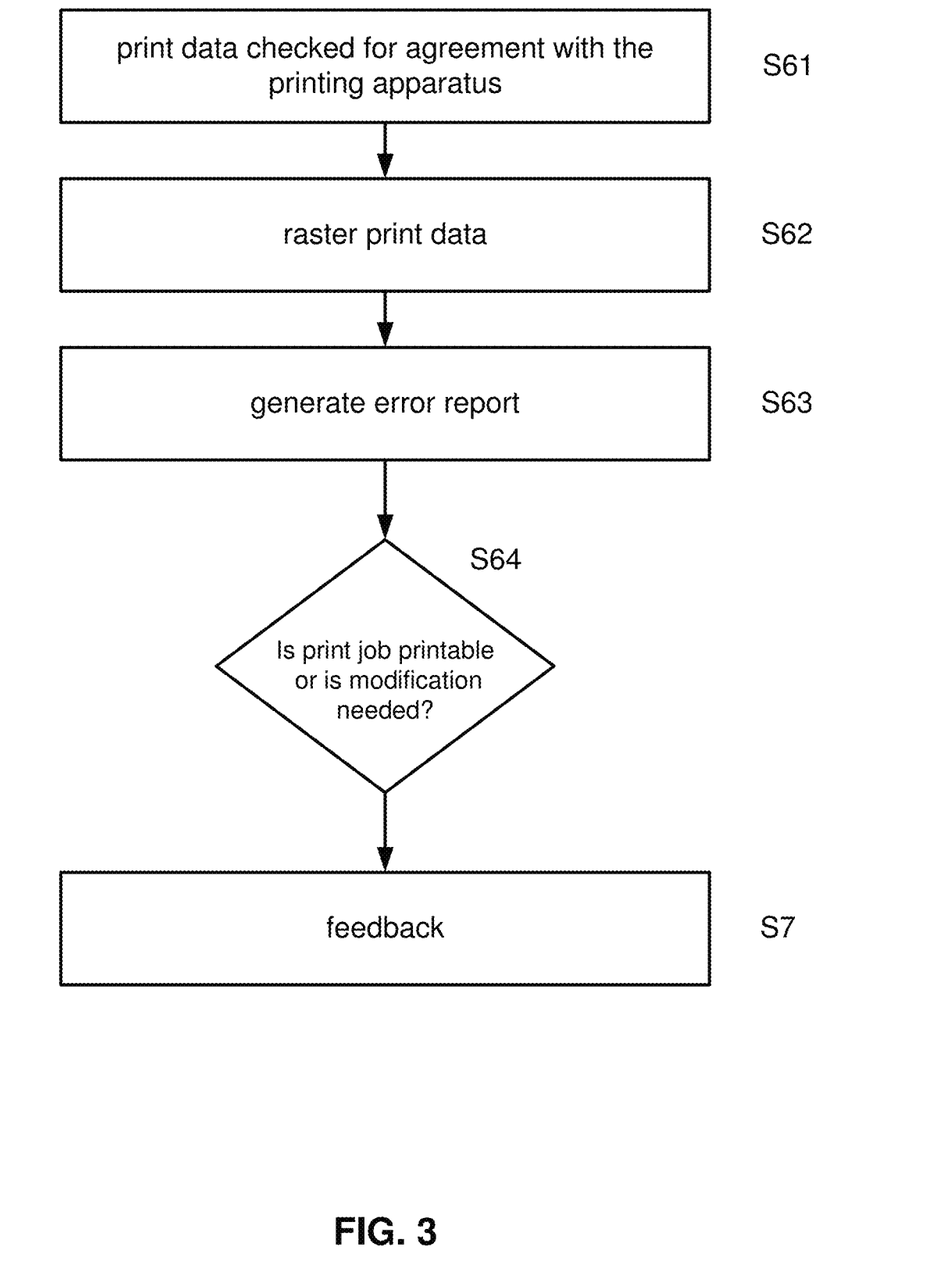
FIG. 3 a flowchart of operations S6 and S7, according to an exemplary embodiment, of the method illustrated in FIG. 2.

The step S6 is depicted in detail together with step S7 in FIG. 3. First, in step S61 the print data are checked for agreement with the printing apparatus. If error messages have occurred in the preceding two steps, these error messages are inserted into the report in step S63.

In step S61, such error messages are to be ascribed to missing fonts, for example, or in step S62 to stopping the printing apparatus due too high a transport velocity or too low a processing speed in the image raster computer. In step S64, the decision is then made as to whether the present print job with the parameters contained therein may be printed, or whether a modification of the print job is necessary. Following this is step S7, with the feedback to the monitoring module.

It may now occur that the speed of the delivery of rastered image data only temporarily falls below the speed of the withdrawal of data. It is then not absolutely necessary to declare the print job to be unfeasible. If the speed of the delivery of rastered image data would lead only to a temporary reduction in the transport velocity, but not to a complete standstill of the printing apparatus, it may be sufficient to output an error message with lower weighting.

An error message with high weighting is in any event to be output if the printing apparatus would come to a standstill because the speed of the withdrawal of rastered image data from the memory exceeds the speed of the delivery of rastered image data over a longer period of time, such that the memory is completely emptied.

If the print speed is too high, such that an error message is generated based on which the printing is classified as impossible, the method is then repeated automatically. The first repetition may be implemented with a speed reduced by 20%, for example, thus at 80% of the originally intended speed. If a printing is then possible, the method is implemented at 90% of the originally intended speed and it is checked again whether a printing is now possible. In this way, the maximum achievable speed may be determined in an iterative process.

It is recommended that the method described in the preceding to determine the maximum achievable speed be implemented during the downtime of the printer, for example at night or during maintenance of the printer. This method is thus preferably executed when all mechanical parts of the printer are not moving, for example as is the case at night. It is hereby unnecessary that personnel be on site to operate the printer. These "downtimes" of the printer may thus be actively utilized in order to simulate the ability of the print jobs to be executed.

It is particularly important to implement the method described in the preceding if components of the computer are swapped out. Due to the availability of the respective hardware, it may be that the same amount of memory is no longer available as the memory with which the printing apparatus was originally delivered. Due to the preceding considerations, it is immediately clear that the achievable print speed decreases given less memory. It may thus occur that a print job that earlier could be processed without any problems may no longer be processed at a later point in time because sufficient memory is no longer available in the printing apparatus. A lower print speed must then be set, for example. Therefore, it is recommended that the method described here also be implemented for print jobs that have already been successfully processed once with the present printing apparatus if changes have been made in the computer system of said printing apparatus.

Furthermore, the printing duration for the respective print job may be determined using the established maximum speed and the page count of the print data or the paper length to be printed to.

With the method, it is also possible to have the same print job implemented only in simulation, thus without actual material consumption, at a plurality of printing apparatuses. Among a plurality of printing apparatuses of the same type, that printing apparatus may thus be selected that requires the shortest printing duration for a predetermined print job. Given use of a plurality of different printing apparatuses, given different apparatus costs that printing apparatus may be selected that can execute a predetermined print job with the lowest costs.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 printing system
2 print server
3 image raster computer
4 drive/transport controller
5 cloud (computer network)
6 printing apparatus
7 control panel unit/central controller (computer)
8 print controller
9 recording medium
10 take-off
11 take-up
12 service unit
S1 create print job
S2 first test of the print data
S3 activate simulation state
S4 start print job
S5 transfer print data to printing apparatus
S6 supply print data to image raster computer
S7 provide feedback to monitoring module
S61 review print data
S62 raster print data
S63 create report
S64 decide about printing capability
S65 transmit report and result to monitoring module

The invention claimed is:

1. A method for simulating a printing process of print jobs in a digital high-capacity printing system including a print server and a printing apparatus, the method comprising:
activating a simulation state of the printing apparatus by a system monitor of the digital high-capacity printing system;
starting a print job, including unrastered print data, at the print server by the system monitor of the digital high-capacity printing system;
transferring the unrastered print data to the printing apparatus;
supplying the unrastered print data to an image raster processor of the printing apparatus while data is steadily removed from the image raster processor to simulate printing and deleted, wherein a speed of the removal of the data corresponds to a print speed; and
providing feedback to the system monitor of the digital high-capacity printing system about an occurrence of an error message of the image raster processor or of another component of the printing apparatus.

2. The method according to claim 1, wherein the system monitor is configured to ascribe predetermined weightings to different error messages.

3. The method according to claim 1, wherein the steps of starting the print job, transferring the print data, simulation of printing, and providing feedback are implemented repeatedly, beginning with the starting of the print job, with a variation of defined parameters.

4. The method according to claim 3, wherein the variation of the define parameters comprises varying the print speed, a minimum printing duration being determined from a maximum achievable print speed and from a page count of the print data.

5. The method according to claim 1, wherein the system monitor of the digital high-capacity printing system is started by a service computer of the digital high-capacity printing system.

6. The method according to claim 1, wherein the system monitor of the digital high-capacity printing system is started by a controller of the printing apparatus.

7. The method according to claim 1, wherein the system monitor of the digital high-capacity printing system is started by the print server.

8. The method according to claim 1, wherein the method is implemented with a plurality of different printing apparatuses.

9. The method according to claim 1, wherein the print server and/or the printing apparatus include a plurality of modules, wherein the modules are software and/or hardware modules.

10. The method according to claim 1, wherein a user, via the system monitor, activates the simulation state of the printing apparatus.

11. A non-transitory computer-readable storage medium with an executable program stored thereon, wherein, when executed, the program instructs a processor to perform the method of claim 1.

12. A system monitor for monitoring a simulation of a printing process of print jobs in a digital high-capacity printing system including a print server and a printing apparatus, the system monitor comprising:
a memory that stores instructions; and
a processor that is configured to execute the instructions to:
activate a simulation state of the printing apparatus;
control the print server to start a print job that includes unrastered print data;
control the print server to transfer the unrastered print data to the printing apparatus;
control the printing apparatus to supply the unrastered print data to an image raster processor of the printing apparatus while data is steadily removed from the image raster processor to simulate printing and deleted, wherein a speed of the removal of the data corresponds to a print speed; and analyze feedback provided to the system monitor about an occurrence of an error message of the image raster processor or of another component of the printing apparatus.

13. The system monitor according to claim 12, wherein the processor is configured to ascribe predetermined weightings to different error messages.

* * * * *